Figure 1:
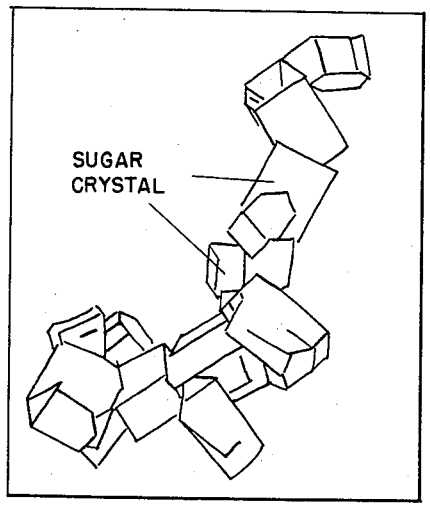

March 15, 1960  A. C. NOWLIN  2,928,747
SUGAR COMPOSITION CONTAINING A CRYSTALLIZING AGENT
AND PROCESS FOR PRODUCING THE SAME
Filed July 21, 1958

INVENTOR.
ANNE C. NOWLIN
BY
ATTORNEY

2,928,747

SUGAR COMPOSITION CONTAINING A CRYSTALLIZING AGENT AND PROCESS FOR PRODUCING THE SAME

Anne C. Nowlin, Cambridge, Mass., assignor, by mesne assignments, to John A. Manning Paper Company, Inc., Troy, N.Y., a corporation of New York Application July 21, 1958, Serial No. 750,046

9 Claims. (Cl. 99—134)

This invention relates to a process of crystallization and more particularly to the formation of extremely small crystals.

In the food industry and especially in the making of confections, the major ingredient of which is sugar, it is desirable to have the sugar present in the final product in as fine a crystalline state as possible. This is desirable because the extremely fine crystals give the confection a pleasing texture. Moreover it is desirable to make confections which can be stored over long periods of time without becoming hard or brittle. The term confection as used hereinafter includes candies, fondants, frostings, sauces and the like wherein the major ingredient is sugar in one form or another.

In addition to confections other food products present similar problems in crystalline size and storability. For example, in making ice creams, sherbets and the like, it is desirable to prevent or minimize the formation of any sizeable ice crystals. As in the case of confections it is apparently primarily a problem of reducing the crystalline size of the sugar and ice below a certain limit to make the product pleasing to the taste and to give it an acceptable texture.

In the making of confections it is customary to use some invert sugar, an inverting agent, a softening agent, a humectant (such as Sorbitol which is a derivative of dextrose), or glycerin to control the crystal size of the sugar and hence to impart better keeping quality to the confection. The use of a synthetic softening agent carries with it the possibility that it may be toxic or otherwise harmful for human consumption. Moreover, possible toxicity of such an additive is often difficult to determine or slow to be recognized.

The addition of an inverting agent such as cream of tartar, usually depends on variations in atmospheric conditions. Moreover, the adding of such a so-called "doctor" must be done by someone skilled in the art of candy making and must be varied from day to day to correct for humidity conditions. Actual handling of additives may also be a problem since inverted sugars and the like normally come in liquid form and their use requires that these heavy liquids be handled and stored with great care.

It will be seen that the use of presently known additives for controlling sugar crystallization in confections has disadvantages. It would therefore be desirable to have an additive which could be used in small quantities, which would achieve reliable and continuously reproducible results independent of atmospheric conditions, and which could be handled as a dry material.

It is therefore an object of this invention to provide an additive which is capable of causing sugars to crystallize out in very fine form. It is another object to provide such an additive which is completely non-toxic and which does not detract from the flavor of foodstuffs to which it may be added. It is another object to provide confections which have improved texture and which may be stored over extended periods of time without becoming hard or unpalatable. It is still another object to provide an additive which will impart improved texture to such food stuffs as ice cream, sherbets, and the like. These and other objects will become apparent in the following discussion.

The additive which has been found to achieve the above listed objects is a dry material prepared by dehydrating the mucilage-producing content of okra pods. The okra product (hereinafter referred to as "dried product") which is suitable for the practice of this invention is a dry powder extracted from okra pods by any suitable process which permits removal of the water, subsequent drying and isolation of the mucilage-producing material contained in the pods. The dried okra product is preferably prepared by a process which reduces the alcohol-soluble materials content to less than 0.8% based on the total weight of the dried okra product, and which as a final step gives a material preferably at least 60% of the individual particles of which are in a size range from 45 to 75 microns.

One such process comprises dehydrating and precipitating the mucilage-producing material of okra pods by means of an organic dehydrating agent such as one of the lower alcohols, and drying the resulting dehydrated and precipitated material under conditions which will not degrade the final dried okra product.

Another process by which dried okra product may be prepared achieves the extraction of the mucilage-producing material of the okra pod by a form of steam distillation using a water-immiscible hydrocarbon.

In any process employed to produce the dried okra product required in the process of this invention, it is preferable that the temperatures and times of processing are such as not to render the final product unstable or degraded with respect to its mucilage-producing abilities. Although the reasons why dried okra product is or is not stable are not understood, it appears that the enzymatic activity associated with the naturally occurring pods must be substantially and rapidly arrested to prevent subsequent degradation of the final product.

I have found that this dried okra has a very marked and unexpected effect on sugars and sugar-containing products. When used in small quantities the dried okra product controls the crystal size of the sugar but does not detract from the flavor of the product containing it.

Figure 2:
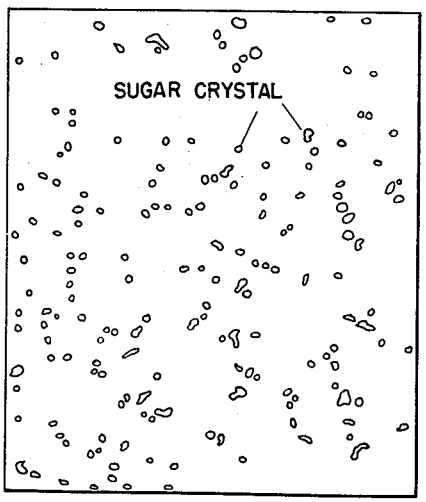

This invention will be further described with reference to the accompanying drawings in which:

Fig. 1 is a tracing from a photomicrograph showing sugar crystals crystallized out from a water solution; and Fig. 2 is a tracing from a photomicrograph, drawn to the same scale as Fig. 1, showing sugar crystals crystallized out from a water solution containing the dried okra product in accordance with this invention.

The effect of the addition of okra to confections, ice cream, and to the general reduction of crystalline size may best be illustrated in the following examples.

Example I

Cane sugar solutions were made up containing 78.5% sugar without the dried okra product as a control solution, and with dried okra product in concentrations equivalent to .024%, .12%, .16%, .22%, and .24% by weight of the solution. The dried okra product was prepared in accordance with the teaching of Serial No. 681,520, filed September 3, 1957, in the name of Charles E. Lanyon. After the solutions had been allowed to stand for two days, those containing the dried okra product showed many fine crystals scarcely visible to the naked eye. In the control solution containing no dried okra product there were far fewer crystals and they were much larger. Microscopic examination of selected crystal samples showed the crystal sizes to be as follows:

|  | Microns |
|---|---|
| Control without okra | 700–1500 |
| 0.024% dried okra product | 140–200 |
| 0.12% dried okra product | 140–200 |
| 0.24% dried okra product | 70 |

The comparative sizes of the crystals formed under these conditions are clearly shown in Figs. 1 and 2. These figures are tracings of photomicrographs drawn to the same scale. In Fig. 1 will be seen the crystals formed in the control solution, while Fig. 2 illustrates the crystals formed with 0.22% okra product by weight in the solution. These figures, along with the measured crystal sizes given in the tabulation above, illustrate in a striking manner the effect which the addition of a very small quantity of dried okra product has on the crystallization of sugar.

*Example II*

Two samples of cooked fudge were made up, one a control sample containing none of the dried okra product and the other containing a small quantity of dried okra product.

The control batch was made by mixing two cups of sugar (414 grams), 2 tablespoons of butter (26.6 grams), one cup of milk (230 grams), and ¼ cup of cocoa (26.9 grams) together. This mixture was heated with stirring until the sugar was dissolved, and then boiled slowly until it reached 111° C. When temperature reached 111° C. it was removed from the heat and cooled by setting it in a pan of cold water. When it had cooled to a lukewarm condition, it was beaten and then pressed into a rough mass on a buttered plate and cut into squares.

A similar batch was made up containing 0.2 gram of dried okra product. This sample containing the additive reached a pouring out consistency sooner than the control sample and required less beating before being pressed out.

Both of the samples had an excellent texture and consistency and the flavor was identical. Individual squares of each of these batches were wrapped in aluminum foil and stored in canisters to determine the aging characteristics of each.

Periodic examinations over three weeks' storage disclosed that the fudge containing the dried okra product remained softer than the control sample. The same effect of adding dried okra product to a cooked frosting was also noted.

*Example III*

Fondants suitable for candy fillings were made with and without the dried okra product. A control sample was made by cooking 2 cups sugar (414 grams), ¾ cup water (172 grams), and ⅛ teaspoon cream of tartar (0.35 gram) with stirring until the sugar dissolved. Heating was then continued at a moderate rate without stirring until the temperature reached 114° C. The mixture was removed from the heat and let stand for ½ minute. The sides of the pan were wiped clean to remove any crystals. The cooled mixture was then poured quickly into an aluminum tray and allowed to cool until it reached 43° C. It was then creamed thoroughly with a spatula and the creamed material placed in a covered dish, with a vessel of water in it, to stand overnight. After standing it was creamed again and flavoring was added.

Another batch of fondant was made using the same quantities except that 0.2 gram of dried okra product was added. It was found in cooking this batch that it was preferable to raise the temperature to only 112° C. to keep the moisture content of the fondant at the proper level. The flavors of the two samples were indistinguishable.

The fondants made with and without dried okra product were permitted to stand in air for a week in glass refrigerator dishes. The samples which did not contain the dried okra product became crusty and hard on the surface and dry and crumbly on the inside; while the samples which contained the dried okra product remained soft and creamy with only a trace of "skin" forming on the surface. When these aging tests were continued for an additional week, the control samples became quite hard and dry while the samples containing dried okra product were still very soft and workable at the end of the two weeks. Even after standing several weeks, it was found that the fondant with dried okra product could be remoistened easily while the control sample remained hard in the presence of water. This same effect is, of course, also noticeable when the fondant is placed in the mouth which means that the addition of the dried okra product makes fondant more palatable.

*Example IV*

Two batches of an "instant" type fudge or frosting mix were prepared by mixing 150 grams of confectioners sugar and 15 grams of cocoa. To one of these batches was added 0.3 gram dried okra product; the other without dried okra product was used as a control. Boiling water was then added to give the mixture a proper consistency for a frosting. After beating the two samples were spread on cup cakes.

The frosting containing the dried okra product was smoother and less granular than the control frosting. In addition, the flavoring of the sample containing dried okra product was better blended and the frosting had more body than the control.

The frosted cup cakes were wrapped in Saran wrap and permitted to stand overnight. Although the frosting containing the dried okra product appeared to adhere to the Saran wrap, when the cup cakes were removed the separation between the frosting and Saran wrap was clean and complete leaving no frosting adhering to the surface. Contrary to this, some of the frosting of the control sample adhered to the Saran wrap when the cup cakes frosted with it were removed.

*Example V*

Two additional batches of the mix of Example IV were made up, one containing dried okra product and one without as a control. In this example only sufficient water was added to give the mixture a candy consistency. The results were the same as observed for the frostings of Example IV. Moreover, the dried okra product made the fudge taste less heavily sweet and seemed to remove some of the bitterness associated with a chocolate or cocoa taste.

The quantity of dried okra product which may be added to sugars or sugar-containing products in accordance with this invention may range from about 0.05 to about 0.5% by weight of the sugars present. It has been found preferable in the making of foodstuffs to add only small amounts preferably no more than about 0.2% by weight of the sugar present. By using a small amount of the dried okra product there is no identifiable change in the flavor nor any visible evidence of the dried okra. It will be noted, however, from Example I that increasing the amount of dried okra product up to about 0.3% of the sugar present the effect in crystal size with increasing additive was still observable. Above about 0.5% the presence of the dried okra is noticeable and would be undesirable but, of course, not physically harmful.

The dried okra product may be added to confections, ice cream or sherbets in accordance with this invention as a dry material (normally a flour-like product) or dispersed in a small quantity of liquid, preferably alcohol.

The use of dried okra product in sugar-containing foods provides a way of imparting to them unexpected and highly desirable characteristics. Among these characteristics are better palatability resulting from crystal size control, better body, improved handling and storing characteristics and, if desired, some flavor modification. Thus, a small amount of a safe and reliable vegetable material can be used to replace the usual softening agents which are not always easy to handle or to control with respect to ambient conditions. The dried okra is consistently reliable and moreover its non-toxicity is assured by the fact that the pods from which it is extracted have been known as a food for thousands of years.

What is claimed is:

1. As a new composition of matter, sugar containing a small amount of dried, dehydrated okra pod extract present in a quantity equivalent to at least about 0.05% by weight of said sugar.

2. As a new composition of matter, a confection comprising a sugar base and a small amount of dried, dehydrated okra pod extract present in a quantity equivalent to at least about 0.05% by weight of said sugar present in said confection.

3. As a new composition of matter, sugar containing a small amount of dried, dehydrated okra pod extract present in a quantity equivalent to from about 0.05% to 0.3% by weight of said sugar.

4. A fondant comprising sugar, water and dried, dehydrated okra pod extract, said dried okra product being present in a quantity equivalent to from about 0.05% to 0.2% by weight of said sugar.

5. Process for crystallizing sugar in extremely fine form, characterized by the step of adding to an aqueous solution of sugar dried, dehydrated okra pod extract in amounts equivalent to at least 0.05% by weight of said sugar in said aqueous solution.

6. Process in accordance with claim 5, wherein said dried, dehydrated okra pod extract is added directly to said aqueous solution.

7. Process in accordance with claim 5, wherein said dried, dehydrated okra pod extract is dispersed in a small quantity of a liquid dispersing medium and the resulting dispersion added to said aqueous solution.

8. Process of forming a confection comprising a sugar base, characterized by the step of adding to said confection, before hardening, a small amount of dried, dehydrated okra pod extract in a quantity equivalent to from about 0.05% to about 0.2% by weight of said sugar present in said confection.

9. A confection comprising a sugar base formed by a process characterized by adding dried, dehydrated okra pod extract to the confection ingredients, said dried okra being present in an amount equivalent to from about 0.05% to 0.2% by weight of the sugar present.

References Cited in the file of this patent
UNITED STATES PATENTS

| | | |
|---|---|---|
| 1,437,816 | Paine et al. | Dec. 5, 1922 |
| 2,041,197 | Lund | May 19, 1936 |

OTHER REFERENCES

The Enzymes by Sumner et al., vol. I, part I, Academic Press Inc., 1950, pp. 529 and 530.

The Chemistry and Technology of Food and Food Products, by Jacobs, 2nd edition, vol. II, 1951, Interscience Publishers, Inc., New York, pp. 1224 and 1225.